United States Patent
Curiger et al.

[11] Patent Number: 6,064,740
[45] Date of Patent: May 16, 2000

[54] METHOD AND APPARATUS FOR MASKING MODULO EXPONENTIATION CALCULATIONS IN AN INTEGRATED CIRCUIT

[76] Inventors: Andreas Curiger, 7744 Village Trail Dr., Dallas, Tex. 75240; Wendell Little, 2300 Stonegate, Denton, Tex. 76205

[21] Appl. No.: 08/969,144

[22] Filed: Nov. 12, 1997

[51] Int. Cl.⁷ .................................................. H04L 9/00
[52] U.S. Cl. ............................ 380/265; 708/7; 708/103; 708/277; 708/490; 708/501; 380/44; 380/30; 380/264
[58] Field of Search ........................... 380/30, 264, 265; 708/3, 7, 8, 103, 105, 277, 490, 491, 501, 503, 504, 533, 606

[56] References Cited

U.S. PATENT DOCUMENTS

| | | | |
|---|---|---|---|
| 4,424,414 | 1/1984 | Hellman et al. | 178/22.11 |
| 4,532,638 | 7/1985 | Lagger et al. | 375/17 |
| 4,658,094 | 4/1987 | Clark | 380/28 |
| 4,891,781 | 1/1990 | Omura | 364/768 |
| 5,261,001 | 11/1993 | Dariel et al. | 380/30 |
| 5,274,707 | 12/1993 | Schafly | 380/30 |
| 5,289,397 | 2/1994 | Clark et al. | 364/746 |
| 5,299,262 | 3/1994 | Brickell et al. | 380/28 |
| 5,414,651 | 5/1995 | Kessels | 364/746 |
| 5,513,133 | 4/1996 | Cressel et al. | 364/754 |
| 5,870,478 | 2/1999 | Kawamura | 380/30 |
| 5,928,315 | 7/1999 | Kobayashi et al. | 708/491 |

OTHER PUBLICATIONS

Kocher, Paul C., Cryptanalysis of Diffie–Hellman, RSA, DSS, and Other Systems Using Timing Attacks, Dec. 7, 1995, pp. 1–6.

Primary Examiner—Tod R. Swann
Assistant Examiner—Paul E. Callahan
Attorney, Agent, or Firm—Jenkens & Gilchrist

[57] ABSTRACT

Circuitry which performs modular mathematics to solve the equation $C = M^k \bmod n$ and n is performed in a manner to mask the exponent k's signature from timing or power monitoring attacks. The modular exponentation function is performed in a normalized manner such that binary ones and zeros in the exponent are calculated by being modulo-squared and modulo-multiplied.

15 Claims, 4 Drawing Sheets

METHOD AND APPARATUS FOR MASKING MODULO EXPONENTIATION CALCULATIONS IN AN INTEGRATED CIRCUIT

BACKGROUND OF THE INVENTION

1. Technical Field of the Invention

The present invention relates to an integrated circuit and method for performing modulo mathematical calculations. In particular, the present invention relates to an integrated circuit that performs modulo exponentiation mathematics with binary numbers.

2. Description of Related Art

Many public-key encryption algorithms, like the RSA encryption and decryption system or the Diffie-Hellman key exchange system, are based on the mathematical operation of modulo exponentiation. This operation can be described as follows:

$$c = M^k \bmod n.$$

In other words, to compute c, raise M to the power of k and divide it by n, then save the remainder of the division instead of the quotient. In a typical RSA calculation, M would be the clear text message to be signed, k would be the private key, n would be the public key (the modulus), and c would be the ciphertext.

Modulo calculations, or synonymously, modular calculations, can be performed by electronic equipment. As the exponent, k, and the ciphertext, M, and size of n increases, the modulo calculations become time and power consuming to the electronic circuits. Generally, computation time depends on the size of n and the value of k. In hardware, circuits that implement modulo mathematics, n and k also provide an indication of the amount of power consumed by the circuit while performing the operation.

As mentioned above, n is publicly known as a public key, but k could be a private key that should be kept secret in order to maintain the integrity of the encryption system. In order to calculate c, it is useful to break the modulo exponentiation up into a multiple of simple operations. Usually, the modulo exponentiation is split up into a series of modulo-square and modulo-multiplication operations. "Modulo" in this context means division by the modulus while saving the remainder of the operation. Consider $C = M^{17} \bmod n$ for example:

$$c = M^{17} \bmod n = ((((1*M \bmod n)^2 \bmod n)^2 \bmod n)^2 \bmod n)^2 * M \bmod n$$

To determine c, first calculate the modulo-multiplication of 1 and M. The result is then modulo-squared four times respectively until we get $M^{16} \bmod n$. Then modulo-multiply this result by M to get $M^{17} \bmod n$.

When modulo mathematics is performed in circuitry on an integrated circuit, the math is generally performed using binary numbers. Taking a closer look at the exponent in the above example, in binary notation, 17 would be (10001). Looking at the bits from most significant (MSB) to least significant (LSB), i.e., from left to right, and performing the modulo math described above, notice that each time a 1 is encountered then a modulo-square is performed with the intermediate result, which is initialized to a 1, and then a modulo-multiply with M is performed. When a 0 is encountered only a modulo-square is performed on the intermediate result to get the next intermediate result. Thus, depending on whether a 1 or a 0 was present in a position in the private key, k exponent, it may take different amounts of time to calculate the next intermediate result.

Thus, cryptosystems often take different amounts of time to process different inputs. For example, if a system uses the same secret exponent, k, for multiple Diffie-Hellman exchanges or RSA encryptions, the exponent can often be determined by an "attack" of monitoring timing aspects of the circuitry which performs the calculations. The attacker may first observe a plurality operations while measuring the time (t) taken to compute each $c = M^k \bmod n$.

According to Paul C. Kocher in his paper, Kocher, CRYPTOANALYSIS OF DIFFIE-HELLMAN, RSA, DSS, AND OTHER SYSTEMS USING TIMING ATTACKS, Dec. 7, 1995, the attack is simplest to understand in an extreme case. Suppose the circuitry can perform a modulo-multiplication extremely fast, but takes a relatively long time to perform both a modulo-square and a modulo-multiply calculation. An attacker can determine the exponent bits by monitoring the calculation process. The bits in the exponent that are 1's will calculate slowly in comparison to the exponent bits that are 0's.

In actual practice, modular exponentiation implementations do not usually have such extreme timing characteristics, but do have enough variation for the attack to work. Furthermore, the total time of the calculation of the whole exponent can also be determined which adds an ability to statistically determine the maximum number of 1's and 0's possible if the modulo calculation time for each 1 and 0 is known.

Another "attack" available to an attacker or pirate is to monitor the power requirements of the integrated circuit. Generally, the modulo math calculation of a modulo-multiply and a modulo-square will each require a different amount of energy when implemented in either hardware or firmware in an integrated circuit. An attacker could monitor the power consumption of an integrated circuit and in a fashion similar to the timing attack determining the exponent k. A "1" will require more power than a 0 to compute a modular exponentiation calculation.

Of course, if possible, both attacks could be performed together thereby potentially increasing the speed at which an attacker could determine the exponent, k, private key.

It would be advantageous to have an integrated circuit that could thwart both the timing attack and/or the power monitoring attack described above.

SUMMARY OF THE INVENTION

An object of the present invention is to provide a modular math calculating method and apparatus that is substantially immune from a timing attack which is intended to determine a private key.

Another object of the present invention is to provide a modular math calculation method and apparatus that is substantially immune from a power monitoring attack intended to determine a private key.

Another object of the present invention is to provide a method of performing modular math calculations in a "normalized" manner.

Another object of the present invention is to provide a method and apparatus capable of performing modular math calculations in either a mode optimized for speed or a mode normalized to mask modulo math calculations.

These and other objectives, which will become obvious from reading and understanding this specification are accomplish by providing an integrated circuit designated to perform modular math calculations via either a software implementation or a hardware implementation. The modular calculations are performed in such a manner that the time and power required to perform each step of the binary modular calculations is normalized. Furthermore, the modular calculation could potentially also be performed in an optimized mode wherein only the necessary calculations are performed and normalizing calculations are completely discarded.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF THE PRESENTLY PREFERRED EXEMPLARY EMBODIMENTS

The present invention preferably is an integrated circuit that comprises a math coprocessor circuit designed to handle modular exponentiation. The integrated circuit is designed so that the modular exponentiation calculation (the modular calculation) is performed without any sort of residual signature of the exponent that can be discovered by monitoring the circuitry. Basically, the exponent is being hidden so that it is extremely difficult to be seen by the outside world via a time monitoring scheme or a power consumption scheme. The present invention "normalizes" the modular calculation in the coprocessor circuit so that every calculation looks the same from a timing and power consumption perspective.

The preferred invention uses the same number of clock cycles to perform a modular square calculation and a modular multiply calculation. Also, the preferred invention is designed to use substantially the same amount of energy/power to perform a modular square calculation and a modular multiply calculation. Furthermore the preferred embodiment of the present invention normalizes the modular exponentiation calculation. What is meant by normalizing the calculation is that the calculation is performed substantially the same way for each and every bit of the exponent in the modular calculation.

Figure 1:
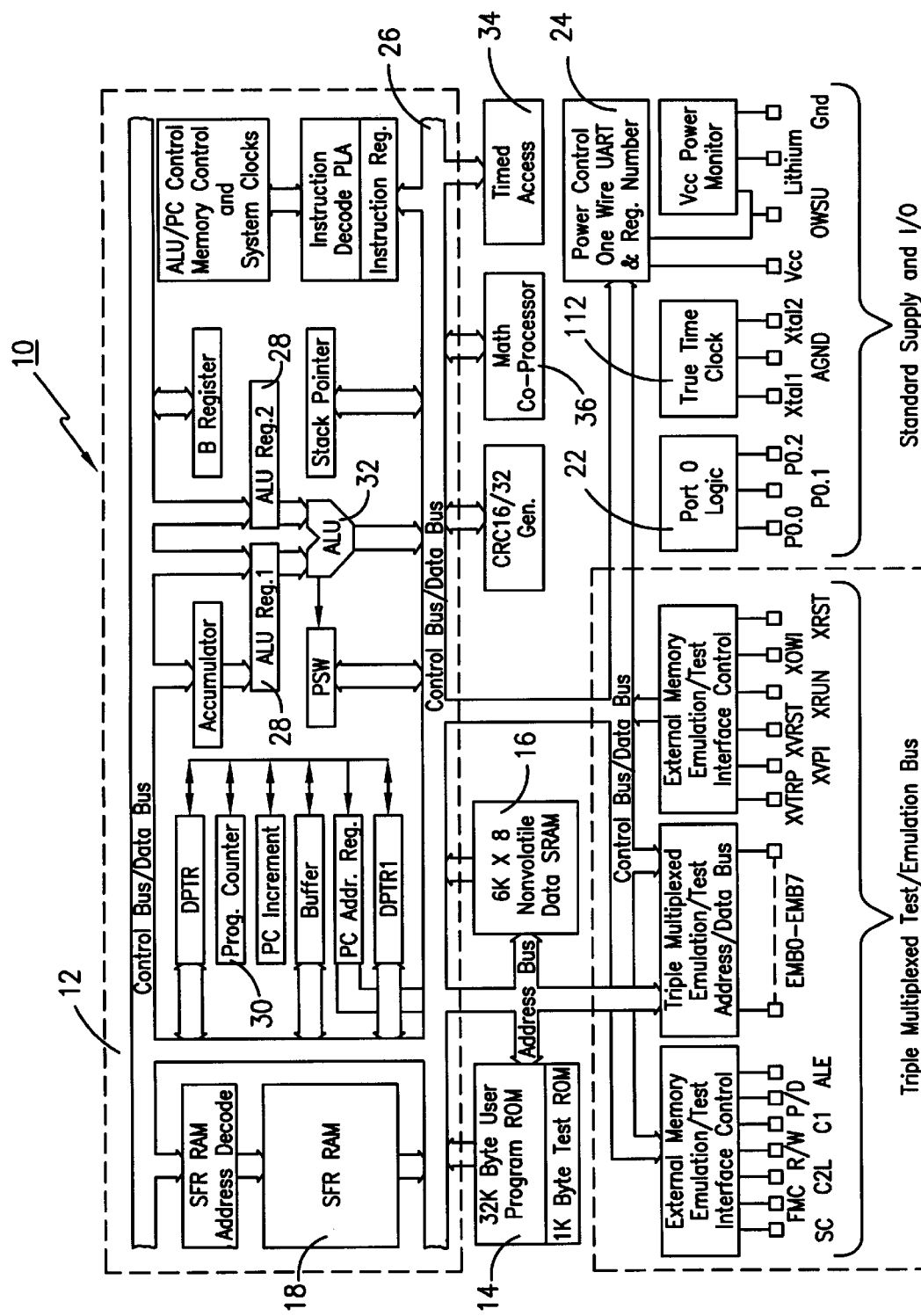
FIG. 1 depicts a block diagram of an exemplary integrated circuit embodying the present invention.

Referring to FIG. 1, the preferred exemplary embodiment of the present invention 10 is depicted in the block diagram. The processor circuitry 10 is generically a microcomputer integrated circuit. Within the microcomputer framework there are major constituent blocks that make up the exemplary processor circuitry.

The first important block is the microprocessor core 12, which is where the majority of calculations are performed and where the other circuitry in the module is controlled. The calculations performed in the microprocessor core 12 are not the same as the calculations performed in the co-processor block 36 (discussed later), but instead are for running the 8-bit instructions associated with the firmware within read only memory (ROM) 14 in the module.

The memory in the module exists in three (3) different forms: being the program memory 14, the data memory 16, and the SFR memory 18. The program memory 14 is preferably a 32K byte user programmable ROM. The data memory 16 is where data is manipulated and stored in large volumes. The data memory is preferably a 6K by 8 non-volatile SRAM block. It is understood that the memory sizes could be any useful size and is purely an engineering choice.

The SFR memory 18 is preferably a "special function register" (SFR) style memory. The SFR memory map is used to support the core microprocessor to execute instructions. The SFR-SRAM block of memory is therefore preferably located in the microprocessor core block 12. Other SFR registers are located in various blocks of the module in order to aid the functions of those blocks without interfering with the operation of the microprocessor core 12.

It is understood that SRAM memory is the preferred data memory 16 configuration in the exemplary embodiment, but one could use a wide variety of memory configurations including EEPROM, EPROM, or any conventional read/write non-volatile SRAM would also work. SRAM is preferred because it allows the tightest packing of memory circuitry in silicon.

Furthermore, non-volatile SRAM is preferably used because it can be quickly destroyed if the power(preferably a battery or other energy source) that backs the SRAM up is discontinued momentarily. One of the many features of this invention is that if the module is tampered with, the memory is wiped clean within a single time frame of a few nanoseconds.

Another block of circuitry in the exemplary secure module is the emulation and test interface circuitry 20. The emulation and test circuitry 20 allows the secure module 10 to operate on program memory 14 and data memory 16 that is connected to the integrated circuit via a bus interface. The bus interface is only used for emulation and testing of the processor circuitry 10. After the processor circuitry 10 has been tested, the emulation and test circuitry is disabled by blowing laser fuses or another type of permanent disconnection means and thereby disconnecting the test and emulation circuitry 20 from the other circuitry in the processor circuitry 10 so that a "back door" to the processor circuitry is eliminated.

Another block is the port logic circuitry 22. The exemplary embodiment has at least one general purpose port pin connected to port logic circuitry 22. The general purpose port pins and the port logic circuitry 22 operate within the framework of the peripheral SFR memory. They are placed in the exemplary processor circuitry 10 primarily so that this processor circuitry 10 can be tested. Other potential future uses could be interfacing the processor circuitry with additional external memories on separate integrated circuits via a three wire interface. The port logic circuitry 22 and the general purpose port pins could also be used to talk to a very large amount of memory that is distally connected to the processor circuitry 10.

For example, if the nonvolatile RAM incorporated into the exemplary processor was deemed to not be large enough and the integrated circuit was densely populated with circuitries so that more memory could not be added to it, one of ordinary skill in the art could add an external 8K by eight or 32K by eight memory chip that has a 3-wire interface on it as opposed to a full multiplexed or de-multiplexed address bus, used by standard generic memories, such that the exemplary chip can then address the additional external memory and thereby expand the capability of the electronic module 10.

The exemplary electronic module preferably has an identification number (ID number) and what is termed as the "front end" of the one-wire section of the One Wire UART. This is depicted in the FIG. 1 in the power control One Wire UART and registration number circuitry 24. The ID is accessible through the OWSU pin which stands for the one wire slave UART pin. The identification number is established by lasering fuses within the integrated circuit thereby creating a permanent, non-volatile encoded ID number of 64-bits. The ID number can be a unique number and is located in this portion of the circuitry, near the one wire interface, primarily to provide the exemplary processor circuitry 10 with the ability to be quickly read and to establish an ID during a one-wire communication. Furthermore, the ID is used in association with the data protocol of the one-wire bus which is used by the exemplary processor circuitry 10. It is understood that the ID number can be incorporated into a different area of the integrated circuit. The ID could be created in another fashion other than with laser fuses. The ID could be stored into a set of ROM memory cells, but a concern would be that the cells could be duplicated in all the manufactured chips thereby not providing a unique ID number. On the other hand, such duplication would be useful if one wanted a common ID for a large number of electronic modules. The ID could also be expressed in any one of the various non-volatile memories, including SRAM, EEPROM, flash memory, antifuse memory, EPROM, ferro-electric, ferro-magnetic, etc., types of memories. If the ID is loaded into a memory during the manufacture of the secure electronic module, then the module electronics could be designed to allow the one wire slave UART to read that portion of memory directly. Thus, one of ordinary skill in the art would understand that there are many manifestations of where the ID could exist within the secure module electronics. Again, in the exemplary embodiment it is preferred that it is placed as lasered fuses in the one wire UART because it is part of the one wire protocol and allows the electronic module to be identifiable. Note that an ID is not necessarily required.

Referring again to FIG. 1, the microprocessor core block 12 communicates with other circuitry blocks via a control/databus 26. The databus 26 in the preferred embodiment is a standard 8051 interface bus which is internal to the integrated circuit. The data bus basically provides an eight bit data package when the microprocessor core 12 is talking to the SFR memory 18. Addresses are transferred across the data bus 26 in a multiplexed fashion and then data is carried on the bus and read or written to a memory location. In another form of the present exemplary embodiment, the microprocessor core 12 could output a sixteen bit address field which is not directly used by the SFR memory map, but instead is used within the data memory map and the program memory map.

There are few memory maps found in the preferred exemplary embodiment. First, there is the program memory map which is a general purpose memory whose locations are accessed by a sixteen bit address bus that comes from the microprocessor core and in particular from the PC address register. The PC address register has incorporated within a program counter which provides an address so that the microprocessor can sequentially go through the different locations within the program memory via this sixteen bit number that comes out of the program counter. The data that comes out of the program RAM or EPROM, or other form of memory, is communicated on the data bus 26 and received by one of the ALU's instruction registers 28 so that the code can be executed. In a similar fashion, another memory map, the data memory map, works in parallel with the program memory 14. The address which comes out of the program counter 30, also addresses the data memory map. The data from the memory map is provided to the data bus. The ALU 32 decides which memory is to be used based on the type of instruction that is being executed by the microprocessor core 12.

There is a third memory map in the preferred embodiment which is a special function register memory map or the "SFR" memory map. The SFR memory map is handled differently than the program memory map and the data memory map in the microprocessor core 12. The SFR memory map is limited, in the exemplary embodiment, to 256 bytes of memory. The reason for the limitation is that the SFR memory map works on a multiplexed scheme. That is, the addresses from the microprocessor core 12 are output on the databus 26 during different timeslots. All the peripheral circuits around the microprocessor core 12 are looking for potential addresses on the databus 26 during these particular time slots. The peripheral circuits know that the addresses are not going to be data during the timeslots. The peripheral circuits decode the address and, if appropriate, will combine the address with additional control signals from the microprocessor core 12 so that the peripheral blocks understand what to do. Once the address is decoded by the peripheral blocks, the responding peripheral block will either read or write from the databus.

The three different types of memory maps all work under the 8051 microprocessor style architecture and are used in the exemplary embodiment because of the ability of the 8051 microprocessor architecture to do data transfers and to bring instructions to peripheral blocks in very few clock cycles.

It is understood that the present invention uses a microprocessor architecture that has been termed in the art as a Harvard Architecture. It is also understood that other architectures could be used such as a single memory map microprocessor which is used in Motorola microprocessor designs. The single memory map microprocessor is termed a Von Newmann Architecture.

Still referring to FIG. 1, other blocks outside of the microprocessor core 12 will now be discussed. The timed access block 34 is included in the exemplary embodiment because it is relevant to the control of the circuits on the integrated circuit. The timed access circuitry 34 provides a periodic "sobriety test" for the software/hardware operation. In other words, the timed access circuitry is used to make sure that the software and hardware are working together correctly. The timed access circuitry 34 is different from a watchdog timer. The timed access circuitry 34 makes sure that specific functions at a given address within the integrated circuit are happening within a predetermined amount of time. If the functions are occurring outside the predetermined window of time, then the timed access circuit 34 will block the software access to these functions.

Referring to the math coprocessor 36, public-key cryptosystems that are based on modular arithmetic are considered as secure mechanisms for a number of cryptographic applications. The underlying algorithms make use of so-called trap-door functions. Exponentiation in finite fields ("modular exponentiation"), for example, can be performed very quickly compared to the inverse function of computing logarithms.

The present invention incorporates two methods for calculating $C=M^k$ mod n. The first method (optimized mode) uses the most effective and efficient technique for computing exponentiation of large numbers and consists of a series of square and multiply operations. The first method for computing $C=M^k$ mod n for operands of word length N can be described as follows:

```
modexp (M,k,n,N);
c=1;
l=N;
while (k[l] ==0) l=l-1;
for (i=l-1; i >=0; i=i-1) }
    c=c² mod n
        if (k[l]==1) c=c·M mod n;
}
return (c):
```

The present invention also incorporates a second method (normalized mode) which is less efficient, time and energy wise, than the above first method. The second method, when incorporated into electronic circuitry is advantageous in that it effectively masks the private key signature (k) of the private key during modulo calculations from time monitoring attacks and power monitoring attacks.

The second method (normalized mode) can be described as follows:

```
modexp (M,k,n,N, ocalc);
c=1;
l=N;
if (ocalc) while (k[l]==0) l=l-1;
for (i=l-1; i >=0; i=i-1) {
    c=c·c mod n;
    if ((k[l] ==1) or not (ocalc)) tmp=c·M mod n;
    else tmp = c·1 mod n;
    c=tmp;
}
return (c);
```

In an exemplary embodiment of the present invention, a complete exponentiation of a 1024-bit number is performed doing 1024+512=1536 square and multiply operations if a binary modulus e composed of 512 zeros and 512 ones is assumed and the first method (optimized mode) is used (Hamming weight: h=0.5).

Figure 2:
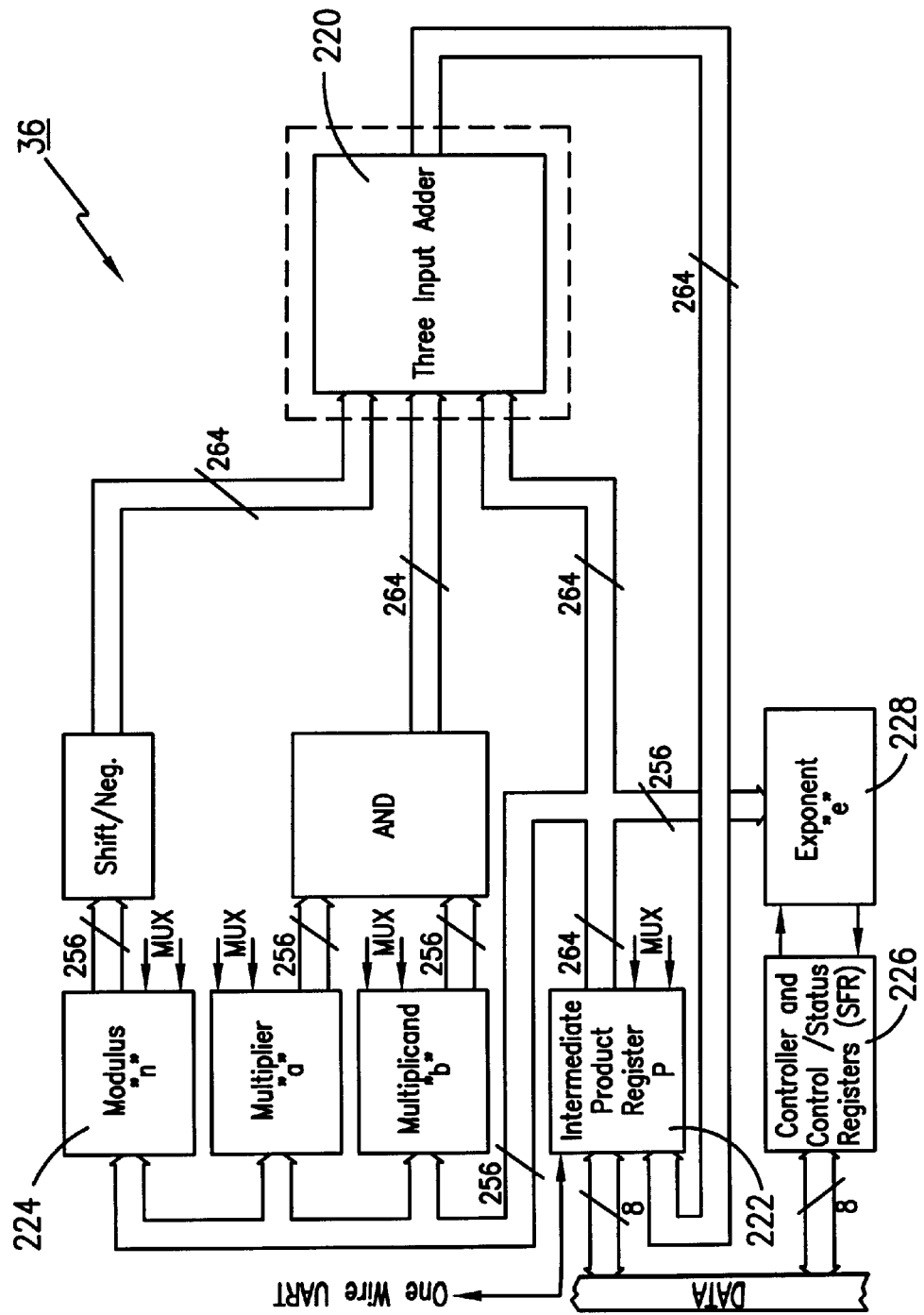
FIG. 2 depicts a block diagram of a preferred modulo mathematics circuit.

Referring now to FIG. 2, one of the most suited methods concerning a hardware implementation of modular calculations is known as Brickell's algorithm. In its full expanded version, i.e. using an N-bit data path, it is able to compute one modular multiplication in N+11 clock cycles, if a true single phase clock is assumed.

The method used for the preferred modulo mathematics circuitry is slightly different than that described by Brickell's algorithm. First, it does not make use of delayed carry number representation, and second, it uses only eight extra bits so that in theory it could be able to calculate one modular multiplication in N+8 clock cycles. The essential part of the algorithm is the computation of the partial product P(i+1) by means of addition of the former partial product, the multiplicand b, and the subtraction of the shifted modulus n:

$$P(i+1)=2*(P(i)+a(i)*b-k*n)$$

The decision whether n shall be subtracted is taken as follows: If the four most significant bits of the partial product are larger than the three most significant bits of the modulus, then k=128. Else if the four most significant bits of the partial product are larger than the two most significant bits of the modulus, then k=64. In any other case, k=0 and therefore no subtraction will be required. It can be shown that if the partial product is computed N+7 times the 1024 most significant bits of P contain the correct result of the modular multiplication P=a*b mod n.

Hardware Architecture of the Coprocessor (FIG. 1, 36) is described bearing this algorithm in mind. The basic building blocks of a modular multiplication unit are straightforward. Four long-word registers are used for storing the operands and the intermediate product. The only additional major block is a 3 operand long-word adder 220. The control logic consists mainly of circuitry for loading and shifting the operands, and of logic for the decisions whether b shall be added and/or k.n shall be subtracted. The basic hardware architecture for the math co-processor 36 is shown in FIG. 2.

The math co-processor circuit 36 will be able to compute a 1024-bit RSA encryption in 1536 * 1031=1,583,616 clock cycles on average. Assuming a single phase clock running at 2.0 MHZ and flip-flops for storing an intermediate product, the computation time will be T=800ms including writing and reading the operands and as a result, respectively.

In order to keep the chip area in a reasonable size as well as to reduce the cycle time, addition is performed in a multiplexed fashion. In other words, a 264-bit three-input adder 220 is used instead of a full 1024-bit three-input adder for computing the intermediate product which is placed in the intermediate product register 222. Furthermore, the microcomputer's clocking scheme makes it possible to store the result using latches instead of flip-flops. There is a (potential) trade off between an increase of computation delay of a factor of four and additional multiplexing logic. The time for RSA encryption adds up to 1536 * 1031 * 4=6,334,464 clock cycles on average resulting in T=3.17 sec for 1024-bit RSA encryption at 2 MHZ.

A CPCTO register (not specifically shown) is designed to control the three primary operational states of the co-processor 36. These include (1) loading and unloading, (2) shifting and storing the modulus, multiplier, multiplicand, and exponent, and (3) performing the required calculation. Values for the modulus, multiplier, multiplicand and exponent are individually loaded (1) into the co-processor through the "P" product register 222. Following the load of the modulus "n" into the "P" product register, a shift and store process (2) is used to simultaneously transfer the contents of the "P" product register into the modulus register 224 while also shifting the data until a "1" is in the most significant bit of the 1024-bit modulus register 224. Shifting of the modulus establishes both the magnitude of the calculation, as well as the number of shifts required during the loading, shifting and storing of the multiplier and multiplier values, following the individual loading of each through the "P" Product Register 222. After all of the data (modulus, multiplier, multiplicand and exponent) has been entered, shifted and stored, the co-processor 36 is then enabled (3) to perform one of four types of calculations. Following the completion of the multiplication process, the results will be placed automatically into the "P" Product Register 222. The results can then be retrieved through the unloading process (1) of the "P" Product Register 222. Each of the three steps (1,2, and 3) outlined above is controlled through the programming of controlling registers.

A Co-Processor Status SFR Register 226 (CPST) is also provided to allow either the microcomputer or the external One Wire Master to determine how far an exponential calculation has progressed. The CPST register 226 provides an 8-bit binary value as to the status of the current co-processor operation. The least significant bit (CSPT.0)

indicates when the co-processor 36 has completed a given operation. During exponential calculations, the remaining seven bits CPST.7–CPST.1 will provide a level of completion of long calculations.

CPST.7–CPST.1 correspond to the seven most significant bits of the exponentiation address pointing to the exponent 228. Consider a 1024-bit exponentiation as an example. The exponentiation counter starts at the value 400 Hex. After having processed the corresponding bit of the exponent, the counter is decremented by one. (Note that the processing of one single exponentiation bit includes one square operation and, in the case where the exponentiation bit is "1", one multiplication.) The calculation will be completed when the exponentiation counter will have reached the value 00 Hex. The calculation can be monitored by means of the CPST register 226 as follows:

| exp counter value | CPST.7–CPST.1 | C[ST/0 (completion) | CPST value |
|---|---|---|---|
| 400 | 40 | 1 | 81 |
| 3FF | 3F | 1 | 7F |
| 3FE | 3F | 1 | 7F |
| — | 40 | — | — |
| 3FO | 3F | 1 | 7F |
| 3EF | 3E | 1 | 7D |
| 010 | 01 | 1 | 03 |
| 00F | 00 | 1 | 01 |
| 001 | 00 | 1 | 01 |
| 000 | 00 | 0 | 00 |

Co-Processor Performance

The time the preferred co-processor needs to perform on n-bit RSA encryption in standard mode is computed in a first-order approach as follows:

$$t(RSA-n) = (n+k)*mux*(1+h)* n* 1/f(clk),$$

where n, k, mux and h are defined as follows:

n: Number of bits of the modulus.

k: Constant inherent to the hardware architecture-k=16 is a good first-order approximation.

mux: Multiplexing factor. mux=4, because the architecture is based on a 256-bit data path, instead of a 1024-bit data path.

h: Hamming weight of the exponent, i.e., number of bits of the exponent which are equal to one. The average case is h=0.5, whereas the worst case would be h=1.0 (Note that the hamming weight for normalized mode is always equal to 1).

f(clk): Clock frequency of the oscillator.

In the following, some values have been computed:

| Encryption type | f(clk) = 1.0 MHz | f(clk) = 10 MHz |
|---|---|---|
| 256-bit, h=0.5 | 418 msec | 41.8 msec |
| 256-bit, h=1.0 | 557 msec | 55.7 msec |
| 512-bit, h=0.5 | 1.62 sec | 162 msec |
| 512-bit, h=1.0 | 2.16 sec | 216 msec |
| 1024-bit, h=1.0 | 6.39 sec | 639 msec |
| 1024-bit, h=1.0 | 8.52 sec | 852 msec |

Initial HSPICE simulations indicate that the oscillator will run at 6.7 MHZ (at 3.0V, 85 degC., worst-case process) and up to 18 MHZ (at 5.0V, 25 degC., typical process) if all the required supply current is available during the whole computation time.

As explained above, preferably the present intention has two modes of operation. One of ordinary skill in the art of circuit or software design would understand a variety of ways and techniques for switching the present invention between the two modes of operation. The first mode is an optimized mode of operation which provides a fast or optimized technique for performing a modular exponentiation calculation.

Figure 3:
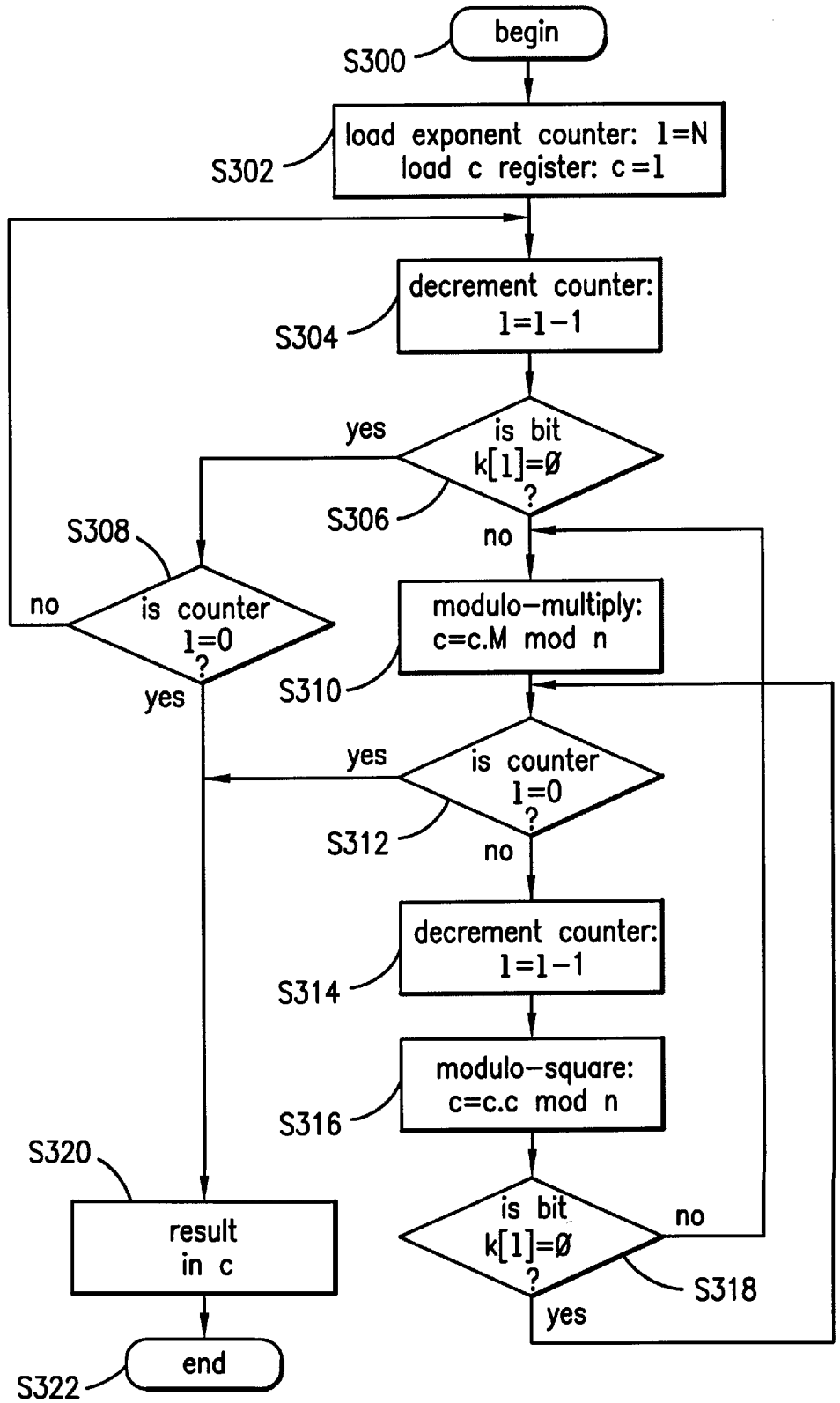
FIG. 3 depicts a flow chart indicating a standard process of performing modular exponentiation in accordance with the present invention.

Referring to FIG. 3, and the following calculation discussion, many public-key encryption algorithms, like RSA encryption and decryption system or Diffie-Hellman Key exchange system, are based on the mathematical operation of modular exponentiation. Modular exponentiation can be described as follows:

$$c = M^k \bmod n.$$

To compute c, raise M to the power of k and divide the result by n. C is equal to the remainder of the division, not the quotient. In a typical RSA calculation, M would be the clear text message to be signed, k would be the private key, and n would be the publicly known modulus; c would equal the ciphertext or digital signiture.

Typically, the operands have binary word sizes in excess of 1024 bits, which correspond to more than 300 decimal digits in length.

To calculate C the modular calculation is generally broken-up into a plurality of smaller calculations that can be handled by the digital electronic circuitry such as the preferred math co-processor 36. Usually, the modular exponentiation is split up into a series of modulo-square and modulo-multiplication operations. "Modulo" in this mathematical context means division by the modulus and saving the resulting remainder of the operation instead of the quotient.

The program for carrying out the optimized modulo exponentiation is as follows:

```
modexp (M,k,n,N);
    c=1;
    l=N;
    while (k[l] ==0) l=l-1;
    for (i=l-1; i >=0; i=i-1) {
        c=c² mod n
        if (k[l]==1) c=c·M mod n;
    }
    return (c):
```

Where k[l] is the i-th bit of the exponent, and N is the number of bits in the modulus. The "while" loop shifts the leading, most significant bit, zeros out of the exponent. The shifting of the zeros helps reduce the time and power required to perform the modulo calculation. The "for" loop starts the calculation with the most significant bit of the exponent set to a one. The program would also work without the "while" loop. In that case, the "for" loop would keep squaring a 1 until the first 1 in the exponent is reached.

FIG. 3 steps through an exemplary optimized program in flow chart form. This program can be implemented in either software or hardware. In the preferred embodiment, it is implemented in hardware.

A Step 300 the program begins. In Step 302 the exponent counter, l, is loaded with the number of bits in the modulus and the c register, for the intermediate product, is loaded with a "1". In Step 304 the exponent counter, l, is decremented by one. In Step 306, it is determined whether the most significant leading l-bit of the exponent, k, is a zero. If the l-bit is a zero then Step 308 determines whether it is the last l-bit. The program continues to Steps 304, and 306. In this manner any leading zeros in the exponent, k, are skipped until the first 1 in the exponent is encountered. When the first 1 is encountered then Step 310 performs the first modulo multiplication.

In Step 312, l is checked to make sure the last bit in the exponent has not been encountered. If the last bit has not been encountered then l is decremented in Step 314. In Step 316 a modulo-square is performed. In Step 318 it is determined if the next bit in the exponent is a zero or a one. If it is a one the program progresses to Step 310 so that both a modulo-multiply and a modulo-square can be performed. If in Step 318 it is determined that the next bit in the exponent is a zero, then the program progresses so that only a modulo-square is performed. This process continues until Step 312 determines that the last bit in the exponent has been calculated (l =0). The result of the modular calculation is placed in register c in Step 320 and the process is complete in Step 322.

One of the ordinary skill would understand that the optimized mode of the present invention performs different calculations depending on whether the current exponent bit is a one or a zero. (see Step 318). This maximizes the speed of the calculation by not performing a modulo-multiply when the exponent is a zero.

The optimized mode could have a variant which inspects the bits from the least significant bit to the most significant bit (instead of most significant to least significant). Other modifications of the basic scheme may inspect several exponent bits at a time (for example two), and perform different operations in the above "for" loop. The basic optimized mode always remains the same: Different modular operations are performed depending on the bit pattern of the exponent. The modular operations will differ in execution time and power consumption.

Again, there are variants in techniques, both hardware and software, to implement the optimized mode modular calculation. However, all the variants will have to follow a few basic principles of the calculation:

1) Storage space for the operands M,k, n and the intermediate result c: In software implementations these variables might be stored in RAM, whereas in hardware implementations there may exist special holding registers.

2) Arithmetic units which are able to compute the basic operations: There must be circuitry capable of computing modulo-multiplication and modulo-square operations. The calculations may also be done by a single circuit which can perform both operations. In the case of software implementations, the arithmetic functions would be performed by an ALU or the CPU. Hardware implementations might make use of a dedicated modulo-multiplication and modulo-square co-processor circuit.

3) A controlling unit which decides the operation to perform next. Hardware implementations normally have a dedicated controlling circuit or processor core, whereas software implementations would make use of an ALU or CPU.

The common idea of the implementations of the optimized mode is to minimize processing time by using an optimized program. The result is different processing time for different operands, especially different values of k. "k" may be the secret key of an encryption system.

Figure 4:
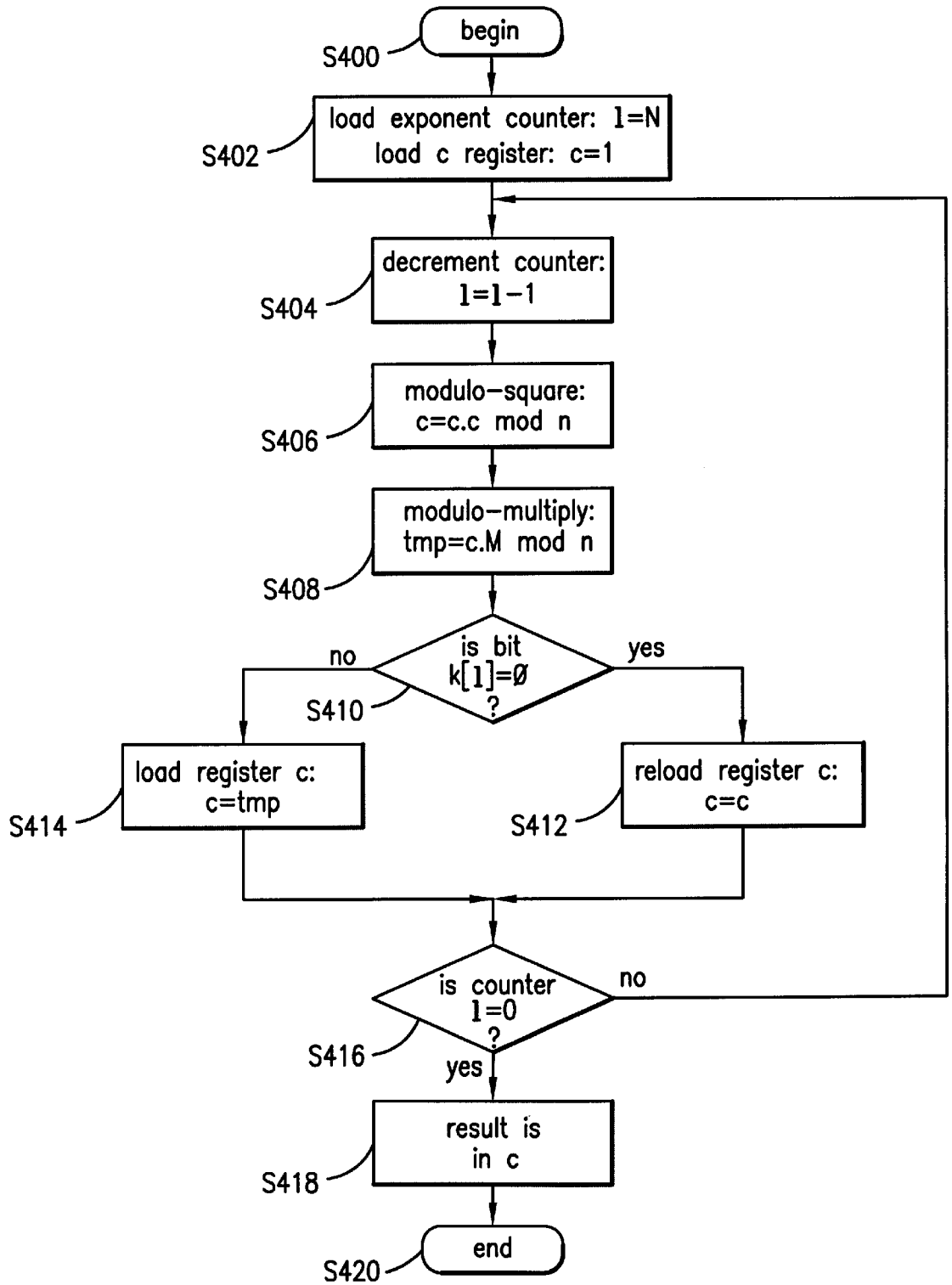
FIG. 4 depicts a flow chart indicating a normalized process of performing modular exponentiation in accordance with the present invention.

Referring to FIG. 4, an exemplary normalized mode is flow charted. The normalized mode is used to overcome the aforementioned drawback of potentially revealing the secret key, k, during modular calculations via a time monitoring or power monitoring attack. The preferred normalized mode pseudo program is as follows:

```
modexp (M,k,n,N, ocalc);
c=1;
l=N;
if (ocalc) while (k[l]==0) l=l-1;
for (i=l-1; i >=0; i=i-1) {
  c=c·c mod n;
  if ((k[l]===1) or not (ocalc)) tmp=c·M mod n;
  else tmp = c·1 mod n;
  c=tmp;
}
return (c);
```

The operands are defined as in the standarized mode. The "ocalc" bit is used by the system to define whether the calculation should be computed via a standarized mode or via the normalized mode. Additionally, a temporary register, "tmp", is added. If "ocalc" is not set, the "while" loop is not executed and thus, leading zeros in the exponent are not shifted out. Modulo-multiplications are always performed, and also modulo-square operations are always performed. The "if" statement from the "optimized" method is replaced in the "normalized" method with an "if-else" statement.

Referring now to FIG. 4, an exemplary normalized method is flow charted (assume "ocalc" is not set). At Step 400 the normalized method begins. At Step 402 the exponent counter l is loaded with the number of bits in the modulus, and the c register for the intermediate product is loaded with a "1". In Step 404 the exponent counter, l, is decremented by one.

In Step 406 a modulo-square calculation is performed and stored into register c. In Step 408 a modulo-multiply calculation is performed and stored in the "tmp" register. In Step 410 a decision is made as to whether the $l^{th}$ exponent bit is a "0" or a "1". If the $l_{th}$ exponent bit is a zero, then c is reloaded into itself in Step 412. If the $l_{th}$ bit is a one, then the number stored in the tmp register is moved into "c" in Step 414. The Steps of 406, 408, 410, 412, and 414 effectively normalize the calculations by requiring the hardware or software to perform both a modulo-square and a modulo-multiply calculation for each and every bit in the exponent, k, regardless of whether the bit is a one or a zero. This exemplary method keeps the results of the modulo-multiply calculation if the $l_{th}$ exponent bit is a 1 otherwise it loses the result in the tmp register.

From an attacker's perspective the present invention takes the same amount of time (clock cycles) and power to process each modular calculation thereby keeping the private key more secure than previous methods.

In Step 416 the counter is checked to determine if the last exponent bit has been calculated. If the last exponent bit has not been calculated then the pseudo program returns to Step 404. If the last exponent bit has been calculated then the final result is placed in "c" and the method comes to an end at Step 420.

The "normalized" method results in various improvements over prior implementations of modular calculations, the improvements being:

1) If "ocalc" is not set, the bit-scanning procedure of a controlling circuit goes from most significant bit to least significant bit and performs substantially the same calculations on each bit regardless of leading zeros;

2) All operations inside the algorithm take the same amount of time. That is, for all branches of the pseudo program, processing takes the same time. Furthermore, because only a single operand is used, the branches will consume the same amount of power while executing; and 3) The "ocalc" bit allows the pseudo program to switch back-and-forth between two modes (optimized and normalized). This allows the process to switch to the fast "optimized" mode in the case where k does not contain sensitive information, for example, RSA in the case of RSA digital signiture verification.

As is clearly seen, the present invention is a significant improvement in the art. The present invention is believed to be especially effective when configured and employed as described herein, however, those with ordinary skill in the art will realize and readily recognize that the present invention can have numerous variations and substitutions and still achieve substantially the same results as achieved by the exemplary embodiments. Thus, the foregoing detailed description is to be clearly understood as being given by way of exemplary illustration and example only.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An integrated circuit containing circuitry for performing modulo exponentiation, said integrated circuit comprising:
    a modulo exponentiation calculation circuit;
    a mode data, said mode data indicating whether said modulo exponentiation calculation circuit should operate in at least a one of a standard mode and a normalized mode;
    when said mode signal indicates that said modulo exponentiation calculation circuit should operate in said standard mode, said modulo exponentiation calculation circuit performs the steps of:
        a first step of determining whether a first bit of an exponent is a one or a zero, if said first bit is a zero then said first step is repeated with the next bit until a first one is found;
        a second step of performing a modulo square calculation with said first one;
        a third step of performing a modulo multiply calculation;
        a fourth step of determining whether the next bit of the exponent is a one or a zero, if the next bit is a one then a modulo square calculation is performed and then a modulo multiply calculation is performed, if the next bit is a zero than a modulo square calculation is performed;
        a fifth step of repeating the fourth step with each remaining bit in the exponent;
    when said mode signal indicates that said modulo exponentiation calculation circuit should operate in said normalized mode, said modulo exponent calculation circuit performs the steps of:
        (a) calculating a modulo square calculation on a first bit of said exponent;
        (b) calculating a modulo multiply calculation on said first bit of said exponent;
        (c) repeating steps (a) and (b) for each remaining bit in said exponent.

2. The integrated circuit of claim 1, wherein after step (b) the result of said step of calculating said modulo multiply is discarded by said modulo exponentiation calculation circuit if first bit or said each of said remaining bits in said exponent is a zero.

3. An integrated circuit for performing modulo exponentiation, said integrated circuit comprising:
    a storage location for storing a mode signal, said mode signal indicating whether said integrated circuit should operate in at least one of a standard mode and normalized mode;
    a modulo exponentiation calculation circuit responsive to said mode signal, if said mode signal indicates that said integrated circuit should operate in said standard mode then said modulo exponentiation calculation circuit performs the steps of:
        (a1) performing a modulo-square operation and then a modulo-multiply operation on an exponent bit that is a one; and
        (b1) performing a modulo-square operation on an exponent bit that is a zero;
    if said mode signal indicates that said integrated circuit should operate in said normalized mode then said modulo exponentiation calculation circuit performs the steps of:
        (a2) performing a modulo-square operation and then a modulo-multiply operation on each exponent bit.

4. The integrated circuit for performing modulo exponentiation of claim 3, wherein said modulo exponentiation calculation circuit performs said modulo-square operation in the same number of clock cycles as said modulo exponentiation calculation circuit performs a modulo-multiply operation.

5. The integrated circuit for performing modulo exponentiation of claim 3, wherein said modulo exponentiation calculation circuit uses substantially the same amount of power to perform either a modulo-square operation and a modulo-multiply operation.

6. An article of manufacture for performing a modular exponentiation calculation in a normalized fashion on a binary exponent, the article of manufacture comprising:
    at least one electronically readable medium;
    processor instructions contained on the at least one electronically readable medium, the processor instructions configured to be readable from the at least one electronically readable medium by at least one processor and thereby cause the at least one processor to operate as to:
    perform a modulo-square calculation on a bit of an exponent; and
    perform a modulo-multiply calculation on said bit of said exponent.

7. The article of manufacture of claim 6, wherein after said operation of performing said modulo-multiply calculation a result is saved in an intermediate storage location only if said bit is a one.

8. The article of manufacture of claim 6, wherein said operation of performing said modulo-square calculation requires substantially the same amount of time as said operation of performing said modulo-multiply calculation.

9. The article of manufacture of claim 6, wherein said bit of said exponent is a one.

10. The article of manufacture of claim 6, wherein said bit of said exponent is a one or a zero.

11. An integrated circuit comprising:
    a first location for storing a binary number;
    an electronic circuit connected to said first location for performing both a modulo square calculation and a modulo multiply calculation on each bit of said binary number, whereby a result of the modulo multiply calculation is not saved as an intermediate result if a bit in said binary number is a zero.

12. The integrated circuit of claim 11, wherein said modulo exponentiation calculation circuit performs said modulo square calculation and said modulo multiply calculation on each bit of said binary number from a most significant bit to a least significant bit.

13. The integrated circuit of claim 11, wherein said modulo exponentiation calculation circuit performs said modulo square calculation and said modulo multiply calculation on each bit of said binary number from a least significant bit to a most significant bit.

14. The integrated circuit of claim 11, wherein said modulo exponentiation calculation circuit receives a plurality clock pulses, and wherein said modulo multiply calculation and said modulo square calculation require the same number of said clock pulses.

15. The integrated circuit of claim 11, wherein the electronic circuit consumes the same amount of power to perform the modulo square calculation and the modulo multiply calculation.

\* \* \* \* \*

UNITED STATES PATENT AND TRADEMARK OFFICE
CERTIFICATE OF CORRECTION

PATENT NO. : 6,064,740
DATED : May 16, 2000
INVENTOR(S) : Curiger et al.

It is certified that error appears in the above-identified patent and that said Letters Patent is hereby corrected as shown below:

Column 12,
Line 16, replace "standarized" with -- standardized --
Line 18, replace "standarized" with -- standardized --
Line 37, replace "$1_{th}$" with -- $1^{th}$ --
Line 38, replace "$1_{th}$" with -- $1^{th}$ --
Line 46, replace "$1_{th}$" with -- $1^{th}$ --

Signed and Sealed this

Eighteenth Day of December, 2001

Attest:

Attesting Officer

JAMES E. ROGAN
*Director of the United States Patent and Trademark Office*